United States Patent
Lean et al.

(10) Patent No.: US 8,869,987 B2
(45) Date of Patent: Oct. 28, 2014

(54) SERPENTINE STRUCTURES FOR CONTINUOUS FLOW PARTICLE SEPARATIONS

(75) Inventors: Meng H. Lean, Santa Clara, CA (US); Ashutosh Kole, Sunnyvale, CA (US); Jeonggi Seo, Albany, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 13/599,558

(22) Filed: Aug. 30, 2012

(65) Prior Publication Data

US 2012/0318719 A1 Dec. 20, 2012

Related U.S. Application Data

(62) Division of application No. 11/606,458, filed on Nov. 30, 2006, now Pat. No. 8,276,760.

(51) Int. Cl.
| | |
|---|---|
| *B03B 5/00* | (2006.01) |
| *B01D 21/00* | (2006.01) |
| *B01D 21/26* | (2006.01) |
| *B01L 3/00* | (2006.01) |

(52) U.S. Cl.
CPC .......... *B01D 21/265* (2013.01); *B01D 2221/10* (2013.01); *B01D 21/0087* (2013.01); *B01L 3/502761* (2013.01)
USPC ........... 209/155; 209/156; 209/208; 209/459; 210/223; 210/295

(58) Field of Classification Search
USPC .......................... 209/143, 155, 156, 208, 459
See application file for complete search history.

(56) References Cited

U.S. PATENT DOCUMENTS

| | | | | |
|---|---|---|---|---|
| 1,133,721 | A | | 3/1915 | Gregg |
| 1,836,758 | A | | 12/1931 | Knapp |
| 2,426,804 | A | | 9/1947 | Roy |
| 2,584,976 | A | * | 2/1952 | Bailey, Jr. ............ 209/459 |
| 2,615,572 | A | | 10/1952 | Hodge |
| 3,225,523 | A | * | 12/1965 | Wiebe ............ 96/263 |
| 3,672,503 | A | | 6/1972 | Mark |
| 3,693,791 | A | | 9/1972 | Beck |

(Continued)

FOREIGN PATENT DOCUMENTS

| | | |
|---|---|---|
| CN | 1149556 | 5/1997 |
| DE | 2809630 | 9/1978 |

(Continued)

OTHER PUBLICATIONS

Thiruvenkatachari et al., "Flocculation-cross-flow microfiltration hybrid system for natural organic matter (NOM) removal using hematite as a flocculent," Desalination, Elsevier, Amsterdam, NL, vol. 147, No. 1-3, XP 004386413, pp. 83-88, Sep. 10, 2002.

(Continued)

*Primary Examiner* — Terrell Matthews
(74) *Attorney, Agent, or Firm* — Fay Sharpe LLP

(57) ABSTRACT

An improved technique for particle separation is provided. A serpentine structure is utilized in a continuous fluid flow environment to allow for suitable separation of particles to occur in a manner that does not require external application of forces to initiate the separation. The geometry of the serpentine structure and associated forces generated in connection with fluid flow therein suffice.

5 Claims, 22 Drawing Sheets

(56) References Cited

U.S. PATENT DOCUMENTS

| | | | |
|---|---|---|---|
| 3,893,921 | A | 7/1975 | Walther et al. |
| 3,933,642 | A | 1/1976 | Wilson |
| 3,948,771 | A | 4/1976 | Bielefeldt |
| 4,001,121 | A | 1/1977 | Bielefeldt |
| 4,128,474 | A | 12/1978 | Ennis |
| 4,153,541 | A | 5/1979 | Rumpf et al. |
| 4,159,942 | A | 7/1979 | Greer et al. |
| 4,189,378 | A | 2/1980 | Wright et al. |
| 4,292,050 | A | 9/1981 | Linhardt et al. |
| 4,324,334 | A | 4/1982 | Wright et al. |
| 4,343,707 | A | 8/1982 | Lucas |
| 4,383,917 | A | 5/1983 | Wells |
| 4,386,519 | A | 6/1983 | Sinkey |
| 4,451,367 | A | 5/1984 | Ruggeri |
| 4,460,391 | A | 7/1984 | Muller et al. |
| 4,462,907 | A * | 7/1984 | Waldecker ............ 210/223 |
| 4,505,811 | A | 3/1985 | Griffiths et al. |
| 4,542,775 | A | 9/1985 | Beck |
| 4,795,553 | A | 1/1989 | Giffard |
| 4,872,972 | A | 10/1989 | Wakabayashi et al. |
| 4,927,437 | A | 5/1990 | Richerson |
| 5,059,226 | A | 10/1991 | Schneider et al. |
| 5,104,520 | A | 4/1992 | Maronde et al. |
| 5,120,436 | A | 6/1992 | Reichner |
| 5,193,688 | A * | 3/1993 | Giddings ............ 209/155 |
| 5,314,529 | A | 5/1994 | Tilton et al. |
| 5,535,892 | A | 7/1996 | Moorhead et al. |
| 5,556,537 | A | 9/1996 | Saarenketo |
| 5,587,128 | A | 12/1996 | Wilding |
| 5,632,957 | A | 5/1997 | Heller et al. |
| 5,653,859 | A | 8/1997 | Parton et al. |
| 5,690,763 | A | 11/1997 | Ashmead et al. |
| 5,715,946 | A * | 2/1998 | Reichenbach ............ 209/156 |
| 5,728,262 | A | 3/1998 | Moss et al. |
| 5,866,000 | A * | 2/1999 | Yeh ............ 210/295 |
| 5,958,240 | A | 9/1999 | Hoel |
| 5,971,158 | A | 10/1999 | Yager et al. |
| 5,993,668 | A | 11/1999 | Duan |
| 6,013,165 | A | 1/2000 | Wiktorowicz et al. |
| 6,087,608 | A | 7/2000 | Schlichter et al. |
| 6,100,535 | A | 8/2000 | Mathies et al. |
| 6,272,296 | B1 | 8/2001 | Gartstein |
| 6,355,491 | B1 | 3/2002 | Zhou et al. |
| 6,422,735 | B1 | 7/2002 | Lang |
| 6,454,945 | B1 | 9/2002 | Weigl et al. |
| 6,527,125 | B2 | 3/2003 | Niitti |
| 6,569,323 | B1 | 5/2003 | Pribytkov |
| 6,811,713 | B2 * | 11/2004 | Arnaud ............ 210/788 |
| 6,827,911 | B1 | 12/2004 | Gering |
| 7,156,970 | B2 | 12/2004 | Lean et al. |
| 6,905,029 | B2 | 6/2005 | Flagan |
| 7,104,405 | B2 | 9/2006 | Bohm et al. |
| 7,163,611 | B2 | 1/2007 | Volkel et al. |
| 7,226,542 | B2 | 6/2007 | Zemel et al. |
| 7,241,423 | B2 | 7/2007 | Golbig et al. |
| 7,282,129 | B2 | 10/2007 | Lean et al. |
| 7,431,228 | B2 * | 10/2008 | Bohm et al. ............ 241/11 |
| 7,473,216 | B2 | 1/2009 | Lolachi et al. |
| 7,491,307 | B2 | 2/2009 | Hsieh et al. |
| 7,497,334 | B2 | 3/2009 | Tyvoll et al. |
| 7,534,336 | B2 | 5/2009 | Volkel et al. |
| 7,584,857 | B2 | 9/2009 | Bohm et al. |
| 7,770,738 | B2 | 8/2010 | Tabata et al. |
| 2002/0130068 | A1 | 9/2002 | Fassbender et al. |
| 2003/0221996 | A1* | 12/2003 | Svoronos et al. ............ 209/1 |
| 2004/0038249 | A1 | 2/2004 | Darteil et al. |
| 2005/0183996 | A1 | 8/2005 | Zemel et al. |
| 2006/0087918 | A1* | 4/2006 | Ji et al. ............ 366/341 |
| 2006/0118479 | A1 | 6/2006 | Shevkoplyas et al. |
| 2006/0158640 | A1 | 7/2006 | Molter et al. |
| 2006/0240964 | A1 | 10/2006 | Lolachi et al. |
| 2008/0128331 | A1 | 6/2008 | Lean et al. |
| 2009/0014360 | A1* | 1/2009 | Toner et al. ............ 209/208 |
| 2009/0050538 | A1 | 2/2009 | Lean et al. |
| 2009/0114601 | A1 | 5/2009 | Lean et al. |
| 2009/0114607 | A1 | 5/2009 | Lean et al. |
| 2009/0283452 | A1 | 11/2009 | Lean et al. |
| 2009/0283455 | A1 | 11/2009 | Lean et al. |

FOREIGN PATENT DOCUMENTS

| | | |
|---|---|---|
| DE | 2829592 | 1/1980 |
| DE | 2929139 | 1/1981 |
| DE | 3736504 | 3/1989 |
| DE | 4200802 | 7/1993 |
| DE | 19855256 | 6/2000 |
| DE | 10001737 | 10/2001 |
| DE | 102004039182 | 2/2006 |
| EP | 0448973 | 10/1991 |
| EP | 1407807 | 4/2004 |
| EP | 1681549 | 7/2006 |
| EP | 1795894 | 6/2007 |
| EP | 1942329 | 7/2008 |
| EP | 2060312 | 5/2009 |
| FR | 2571354 | 4/1986 |
| FR | 2753392 | 3/1998 |
| GB | 330163 | 6/1930 |
| GB | 386080 A | 1/1933 |
| GB | 934423 | 8/1963 |
| GB | 2012193 | 7/1966 |
| GB | 1039485 | 8/1966 |
| GB | 2024038 | 1/1980 |
| GB | 2098091 | 11/1982 |
| GB | 2209969 | 6/1989 |
| JP | 60071083 | 4/1985 |
| JP | 63319017 | 12/1988 |
| JP | 5007795 A | 1/1993 |
| JP | 2001121039 | 2/2001 |
| JP | 2007069179 | 3/2007 |
| JP | 9299712 | 11/2007 |
| JP | 04504975 B2 | 7/2010 |
| KR | 20030003206 | 1/2003 |
| WO | WO8603140 | 6/1986 |
| WO | WO8810239 | 12/1988 |
| WO | WO9838134 | 9/1998 |
| WO | WO2004113877 | 12/2004 |
| WO | WO2006056219 | 6/2006 |

OTHER PUBLICATIONS

Gascoyne et al., "Particle Separation by Dielectrophoresis," Electrophoresis 2002, 23, pp. 1973-1983, Houston, Texas, 2002.

Bennett et al., "Combined Field-Induces Dielectrophoresis and Phase Separation for Manipulating Particles in Microfluidics," American Institute of Physics, vol. 82, No. 23, pp. 4866-4868, Dec. 8, 2003.

Inglis et al., "Continuous Microfluidic Immunomagnetic Cell Separation," American Institute of Physics, vol. 85, No. 21, pp. 5093-5095, Nov. 22, 2004.

Giddings, "Field-Flow Fractionation: Analysis of Macromolecular, Colloidal, and Particulate Materials," Science, vol. 260, pp. 1456-1465, Jun. 4, 1993.

Reschiglian et al., "Field-Flow Fractionation and Biotechnology," Trends in Biotechnology, vol. 23, No. 9, pp. 475-483, Sep. 9, 2005.

Segrée et al., "Radial Particle Displacements in Poiseuille Flow of Suspensions," Nature Publishing Group, No. 4760, pp. 209-210, Jan. 21, 1961.

Segrée et al., "Behaviour of Macroscopic Rigid Spheres in Poiseuille. Flow Part 2. Experimental Results and Interpretation," Weizmann Institute of Schence, Rehovoth, Israel, pp. 136-157, received Nov. 6, 1961 and in revised form Mar. 16, 1962.

Leighton et al., "The Lift on a Small Sphere Touching a Plane in the Presence of a Simple Shear Flow," Journal of Applied Mathematice and Physics (ZAMP), vol. 36, pp. 174-178, Jan. 1985.

Cherukat et al., "The Inertial Lift on a Rigid Sphere in a Linear Shear Flow Field Near a Flat Wall," J. Fluid Mech. 1994, vol. 263, pp. 1-18, Received Mar. 8, 1993 and in revised form Aug. 18, 1993.

Saffman, "The Loft on a Small Sphere in a Slow Shear Flow," J. Fluid Mech. 1965, vol. 22, Part 2, pp. 385-400, Received Oct. 29, 1964.

Rubinow et al., "The Transverse Force on a Spinning Sphere Moving in a Viscous Fluid," Institute of Mathematical Sciences, New York University, New York, pp. 447-459, Mar. 13, 1961.

(56) References Cited

OTHER PUBLICATIONS

Ho et al., "Inertial Migration of Rigid Spheres in two-Dimensional Unidirectional Flows," J. Fluid Mech. 1974, vol. 65, Part 2, pp. 365-400, Received Sep. 4, 1973.

Vasseur et al., "The Lateral Migration of a Spherical Particle in Two-Dimensional Shear Flows," J. Fluid Mech. 1976, vol. 78, Part 2, pp. 385-413, Received Dec. 4, 1975.

Feng et al., "Direct Simulation of Initial Value Problems for the Motion of Solid Bodies in a Newtonian Fluid. Part 2., Couette and Poiseuille Flows," J. Fluid Mech. 1994, vol. 277, pp. 271-301, Received Sep. 20, 1993 and in revised form May 11, 1994.

Asmolov, "The Inertial Lift on a Spherical Particle in a Plane Poiseuille Flow at Large Channel Reynolds Number," J. Fluid Mech. 1999, vol. 381, pp. 63-87, Received Feb. 28, 1997 and in revised form Sep. 10, 1998.

Asmolov, "The Inertial Lift on a Small Particle in a Weak-Shear Parabolic Flow," American Institute of Physics, vol. 14, No. 1, Jan. 2002.

Matas et al., "Inertial Migration of Rigid Spherical Particles in Poiseuille Flow," J. Fluid Mech. 2004, vol. 515, pp. 171-195, Received Apr. 17, 2003 and in revised form Apr. 19, 2004).

Yang et al., "Migration of a Sphere in Tube Flow," J. Fluid Mech. 2005, vol. 540, pp. 109-131, Received Mar. 30, 2004 and in revised form Apr. 13, 2005.

Michaelides, Hydrodynamic Force and Heat/Mass Transfer From Particles, Bubbles, and Drops-The Freeman Scholar Lecture, Journal of Fluids Engineering, vol. 125, pp. 209-238, Mar. 2003.

Cherukat et al., "Wall-Induced Lift on a Sphere," Int. J. Multiphase Flow, vol. 16, No. 5, 1990, pp. 899-907, Received Nov. 6, 1989 and in revised form Apr. 1, 1990).

Cherukat et al., "The Inertial Lift on a Rigid sphere Translating in a Linear Shear Flow Field," Int. J. Multiphase Flow, vol. 20, No. 2, 1994, pp. 339-353, Received Feb. 20, 1993 and in revised form Oct. 10, 1993.

Berger et al., "Flow in Curved Pipes," Ann. Rev. Fluid Mech. 1983, vol. 15, pp. 461-512, 1983.

Gupalo et al., "Velocity Field of a Liquid Stream in a Spiral Channel of Rectangular Cross Section," pp. 109-112. Translated from Izvestiya Adademii Nauk SSSR, Mekhanika Zhidkosti I Gaza, No. 1, pp. 131-136, Jan.-Feb. 1977. Original article submitted Jan. 8, 1976.

Dean, "Fluid Motion in a Curved Channel," Imperial College of Science, pp. 402-420, Jul. 31, 1928.

Sudarsan et al., "Multivortex Micromixing," PNAS, vol. 103, No. 19, pp. 7228-7233, May 9, 2006.

Xia et al., "Soft Lithography," Annu. Rev. Mater. Sci. 1998, vol. 28, pp. 153-184, 1998.

Seo et al., "Integrated Multiple Patch-Clamp Array Chip Via Lateral Cell Trapping Junctions," American Institute of Physics, vol. 84, No. 11, pp. 1973-1975, Mar. 15, 2004.

Yang et al., "Particle Separation in Microfluidic Channels Using Flow Rate Control," Proceedings of IMECE2004-60862, pp. 1-6, Anaheim, CA, Nov. 13-19, 2004.

Takagi et al., "Continuous Particle Separation in a Microchannel having Asymmetrically Arranged Multiple Branches,", Lab on a Chip 2005, Lab Chip, 2005, 5, pp. 778-784, May 19, 2005.

Zhang et al., "Continuous Flow Separation of Particles Within an Asymmetric Microfluidic Device," Lab on a Chip 2006, Lab Chip, 2006, 6, pp. 561-566, Mar. 13, 2006.

Narayanan et al., "A Microfabricated Electrical SPLITT System," Lab on a Chip 2006, Lab Chip, 2006, 6, pp. 105-114, Dec. 5, 2005.

Kapishnikov et al., "Continuous Particle Size Separation and Size Sorting Using Ultrasound in a Microchannel," Journal of Statistical Mechanics: Theory and Experiment, P01012, pp. 1-15, 2006.

Brenner, "Polymer Fabrication and Microfluidic Unit Operations for Medical Diagnostics on a Rotating Disk," Dissertation at Institute of Microsystems, University of Frieburg, Dec. 2005.

Ookawara et al., "Feasibility Study on Concentration of Slurry and Classification of Contained Particles by Microchannel," Chemical Engineering Journal, v. 101, pp. 171-178, 2004.

Matthews et al., "Particle Flow Modelling on Spiral Concentrators: Benefits of Dense Media for Coal Processing?," Second International Conference on CFD in the Minerals and Process Industries, CSIRO, Melbourne, Australia, pp. 211-216, Dec. 6-8, 1999.

Shi et al., "Radial Capillary Array Electrophoresis Microplate and Scanner for High-Performance Nucleic Acid Analysis," Analytical Chemistry, vol. 71, No. 23, pp. 5354-5361, Dec. 1, 1999.

\* cited by examiner

SERPENTINE STRUCTURES FOR CONTINUOUS FLOW PARTICLE SEPARATIONS

This application is a divisional of and claims priority to co-pending U.S. application Ser. No. 11/606,458, filed Nov. 30, 2006, which is hereby incorporated herein by reference.

GOVERNMENT FUNDING

This invention was made with Government support under W911NF-05-C-0075 awarded by U.S. Army. The Government has certain rights in this invention.

BACKGROUND

Particle separation and sorting represents an important requirement especially in biological and chemical processes for both macro-scale and miniaturized lab-on-chip applications. Some of the methods employed today are mechanical sieving and sedimentation which are usually reserved for separation of large particles. Techniques such as hydrodynamic chromatography, size exclusion chromatography and electrophoresis allow separation of smaller particles. Most of these techniques have seen exponential growth but are batch processes that require set-up time for each sample lot.

Field Flow Fractionation (FFF) is another macro-scale separation technique which is 30 years old but has attracted recent interest in microfluidics. This technique requires a transverse field which may be polarization, acoustic, magnetic, thermal, optical, or centrifugal, to sort and collect particles by elution. Particles are sorted by setting them at elevations that result in different flow velocity in the parabolic flow profile. Though the FFF technique is versatile and has the potential to be miniaturized, the requirement of an external field may increase the complexity of the device. Also the use of a particular field method might limit its area of application to certain reagents (e.g. Magnetic FFF). More recent developments in microfluidics based particle separation system include work reported by Yang et. al. (Yang S., Zhan J., *Particle Separation in Microfluidic channels using flow control*, Proceedings of IMECE04') based on the Zweifach-Fung effect, which involves passing the fluid through a channel bifurcation and maintaining different flow rates in each downstream daughter channel. Here, particles are moved into the daughter channel with the higher flow rate. Another approach is Pinched Flow Fractionation (PFF) (Takagi J., Yamada M., Yasuda M., Seki M., *Continuous particle separation in a microchannel having asymmetrically arranged multiple branches*, Lab on a chip 2005). In this method, the media and sample fluids are passed through a pinched section of a channel where the particles get aligned along the wall depending on their size and are subsequently separated downstream in the expansion region. Asymmetric Pinched Flow Fractionation (AsPFF) has also been carried out where the outlet channels have varying flow rates. This increases the resolution of the device. Continuous separation by the use of an asymmetric microfluidics cavity with a variable channel width along with modifying both flow rate and position of inlet of media and sample have been achieved by Zhang et. al. (Zhang X., Cooper J., Monaghan P., Haswell S., *Continuous flow separation of particle within an asymmetric microfluidic device*, Lab on a chip 2006). The phenomenon is based widely on 'pinched inlet' effect where the sample fluid and media fluid is passed side-by-side through a narrow section of the channel. Thus, the different size particles are placed in different positions along the channel depending on their diameter. This section expands gradually and asymmetrically along the length and the particles, on the virtue of their initial position in the narrow section, get placed differentially downstream where the flow profile diverges and the separation thus amplifies owing to the laminar parabolic velocity profile. SPLITT Fractionation is another method used to separate and sort particles (Narayanan N., Saldanha A., Gale B., *A microfabricated electrical SPLITT system*, Lab on a chip 2005), which essentially utilize compression of the sample flow stream by media flow stream right at the inlet. The separation is achieved downstream. Ultrasonic particle separation is another way in which particles get arranged along a pressure node in the fluidic channel on the application of an acoustic field across the channel width (Kapishnikov S., Kantsler V., Steinberg V., *Continuous particle size separation and size sorting using ultrasound in a microchannel*, J. Stat. Mech. (2006) P01012). The particles can be collected downstream and separated from the flow by carefully modifying the downstream geometry. Size based separation may also be possible with this method by use of serpentine channels with the extractions ports as specific intervals. Microfluidics based centrifugal separation has been reported by Brenner (Brenner T., *Polymer Fabrication and Microfluidic Unit Operations for Medical Diagnostics on a Rotating Disk*, Dissertation at Institute of Microsystems, University of Frieburg, December 2005). This essentially is a miniature centrifuge constructed on a rotating disk with polymer microstructures to carry the fluid. Finally, Ookawara (Ookawara, S., Higashi, R., Street, D., and Ogawa, K. *Feasibility Study on Concentrator of Slurry and Classification of Contained Particles by Micro-Channel*, Chem. Eng. J., v. 101, 171-178 (2004)) reported on the use of 200 μm×170 μm microchannels with semicircular radius of 2 mm for centrifugal separation where slurry particles are directed into one arm of a bifurcation channel. The rectangular (170 μm×200 μm) cross-section leads to Dean's vortices in the transverse plane which enhance mixing and re-dispersion.

It should be appreciated that the body of prior work in this field has a variety of shortcomings. For example, all the noted works require an additional external force. Moreover, many of these techniques are limited to batch processing and are scaled to handle only minute volumes of samples. Further, many of these processes are typically designed for only a centrifugal mode of operation.

BRIEF DESCRIPTION

In one aspect of the presently described embodiments, a device comprises an inlet for the fluid, a serpentine channel operative to receive a continuous flow of fluid through the inlet, at least one collection chamber disposed along the channel positioned to collect particles from the continuous flow of fluid and an outlet for the continuous flow of fluid.

In another aspect of the presently described embodiments, collection of particles in the collection chambers depends on at least one of flow velocity, channel width, viscosity and radius of curvature.

In another aspect of the presently described embodiments, collection of particles depends on a velocity of the fluid.

In another aspect of the presently described embodiments, a low velocity of the fluid results in pressure-driven separation.

In another aspect of the presently described embodiments, a high velocity of the fluid results in centrifugal separation.

In another aspect of the presently described embodiments, the separation channel comprises a plurality of curved sections cascaded in series.

In another aspect of the presently described embodiments, a device comprises an inlet for the fluid, a channel having a width and a radius of curvature—the channel being operative to receive a continuous flow of fluid through the inlet, the fluid having a flow velocity and a viscosity, at least one collection chamber disposed along the channel positioned to collect particles from the continuous flow of fluid, wherein collection of particles depends on at least one of the flow velocity, the channel width, the viscosity of the fluid and the radius of curvature of the channel and an outlet for the fluid.

In another aspect of the presently described embodiments, the channel is a serpentine structure.

In another aspect of the presently described embodiments, a low velocity of the fluid results in pressure-driven separation.

In another aspect of the presently described embodiments, a high velocity of the fluid results in centrifugal separation.

In another aspect of the presently described embodiments, the separation channel comprises a plurality of curved sections cascaded in series.

In another aspect of the presently described embodiments, the serpentine channels may have converging or diverging cross-sections to take advantage of the pressure derivative: $dp/dR \propto 1/R^2$.

In another aspect of the presently described embodiments, the channel may use a vertical compression field to load particles against the bottom of the channel for improved operation.

In another aspect of the presently described embodiments, the implementation may be entirely planar with out-of-plane inlet and outlet making it easier to stack several devices on top of each other for parallel operation.

In another aspect of the presently described embodiments, the centrifugal mode may be selected for large sample volumes and continuous high throughput operations.

In another aspect of the presently described embodiments, the pressure driven separation mode may be used for screening small sample volumes, making it amenable for miniaturization.

In another aspect of the presently described embodiments, appropriately positioned fluid-decoupled cavities have rotating sleeves to open/close the cavity for operation/collection.

DETAILED DESCRIPTION

The presently described embodiments provide a system that allows for separation of particles within a fluid (such as biological matter) based on size and mass of the particles. This is accomplished in one form using a serpentine channel. In this case, the curved sections of the channel provide interplay between the outward directed centrifugal force and the inward directed transverse pressure field from fluid shear. In this regard, two modes of operation are implemented. At high fluid velocity, centrifugal force dominates and particles tend to move outward. At low fluid velocity, transverse pressure dominates and the particles tend to move inward in the channel. The magnitudes of the opposing forces depend on flow velocity, particle size, radius of curvature of the curved sections of the channel, channel dimensions and viscosity of the fluid.

Strategically positioned and shaped collection chambers de-couple the flow field but allow particles to enter for collection, and thus separation. For any particle size, the channel length is determined based on an estimate of the transit time for the particle to reach the side wall. This time is a function of flow velocity, channel width, viscosity, and radius of curvature. In one form, larger particles may collect in the section of the channel closer to the inlet, while smaller particles may take more time to migrate to the side wall (and thus the collection chambers) for collection.

The presently described embodiments provide a system which results in improved particle separation techniques. In this regard, the presently described embodiments span micro-scale to macro-scale fluid capacities, and utilizes only channel geometry, radius of curvature, and velocity to exert the required force to separate particles either to the outside or inside channel walls. Many different embodiments are contemplated. For example, a serpentine channel may be comprised of a plurality of curved sections that are cascaded together in series to form a structure having multiple back and forth turns. This type of device can be tuned to various degrees to collect particles of different size, mass, etc. This type of structure also allows for parallelization or extended channel lengths through stacking of planar structures. Materials and fabrication cost are also relatively low, thus allowing for disposable use.

Figure 1:
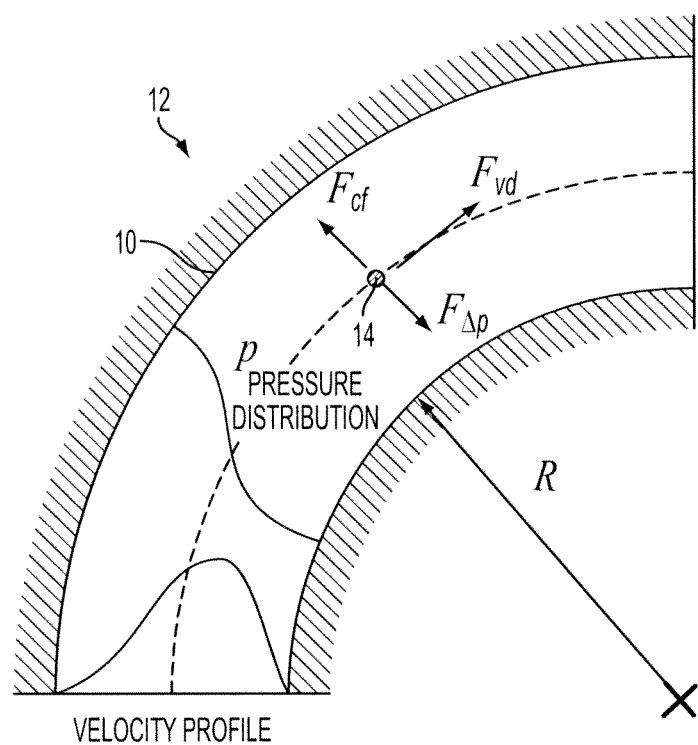
FIG. 1 is an illustration of the forces in a channel for fluid flow.

With reference to FIG. 1, flow in a curved channel is considered. In this regard, the following nomenclature is used:

V=Flow velocity
p=Pressure
$F_{cf}$=Centrifugal force on the particle
$F_{\Delta p}$=Force due to pressure differential
$F_{vd}$=Force due to viscous drag
R=Radius of curvature of the channel
η=Dynamic viscosity of the fluid m=Mass of the particle
r=Radius of the particle assumed to be spherical
ρ=Density of fluid In FIG. 1, a segment 10 of a curved channel 12 is shown along with various forces acting on a particle 14 in the channel 12. Also, a velocity profile and a pressure distribution are represented.

The centrifugal ($\propto r^3$), transverse pressure driven ($\propto r^2$), and viscous drag forces ($\propto r$) acting on the particle can be expressed as follows:

$$F_{cf} = \frac{mV^2}{R} = \rho \frac{4}{3}\pi r^3 \frac{V^2}{R}$$

$$F_{\Delta p} = p\pi r^2$$

$$F_{vd} = 6\pi \eta r V_r$$

The particles will move outwards if $F_{cf} > F_{\Delta p}$, or $$\rho \frac{4}{3}\pi r^3 \frac{V^2}{R} > p\pi r^2 \quad (1)$$

$$i.e. \quad r > \frac{p}{\rho} \frac{R}{V^2} \frac{3}{4}$$

This equation may be used to determine the lower bound for particle size that will move outwards for any given geometry pressure and velocity of flow.

Particles smaller than this lower bound will move inwards.

$$or \quad r < \frac{p}{\rho} \frac{R}{V^2} \frac{3}{4}$$

The distance of travel before the particle migrates across the flow channel (transverse direction) is dependent on the relative magnitudes of $F_{vd}$ and $F_{\Delta p}$.

Also, since $F_{\Delta p} \propto r^2$ and $F_{vd} \propto r$, larger particles will be more affected by the flow induced transverse pressure drop directed towards the inner surface.

The transverse pressure may be derived by considering peripheral flow in a concentric cavity where the parabolic profile fits:

$$V_\theta = V_0(r - r_1)(r_2 - r)$$

and $r_1$ and $r_2$ are the inner and outer radii, respectively. The radial pressure drop, p, is given by:

$$p = \int_1^2 \frac{\rho V_\theta^2}{R} dr =$$

$$V_0^2 \frac{\rho}{R}\left[\frac{r^5}{5} - \frac{(r_1+r_2)r^4}{2} + \frac{(r_1^2 + 4r_1 r_2 + r_2^2)r^3}{3} - r_1 r_2(r_1+r_2)r^2 + r_1^2 r_2^2 r\right]$$

Figure 2A:
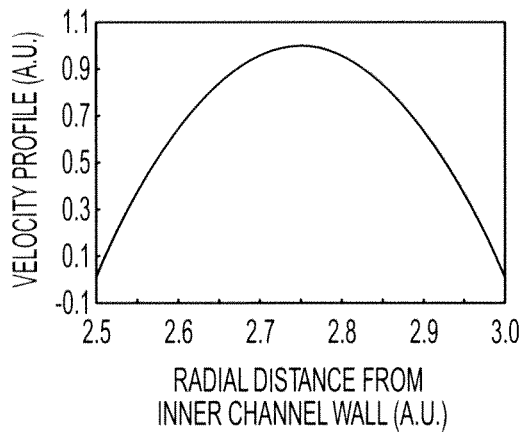
FIGS. 2(a) and (b) show velocity and pressure profiles for a concentric channel.
Figure 2B:
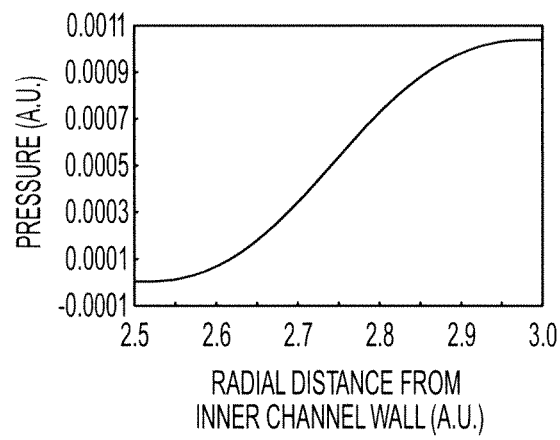

The calculated velocity and pressure profiles are shown in FIGS. 2(a) and 2(b), respectively. The pressure is displayed as a function of distance from the inner wall, beginning from $r_1$ and increasing to $r_2$. The inward-directed pressure field (from the outside wall) is clearly evident. In FIGS. 2(a) and 2(b), the velocity profile and the pressure profile are illustrated for peripheral flow within a concentric cavity.

Figure 3A:
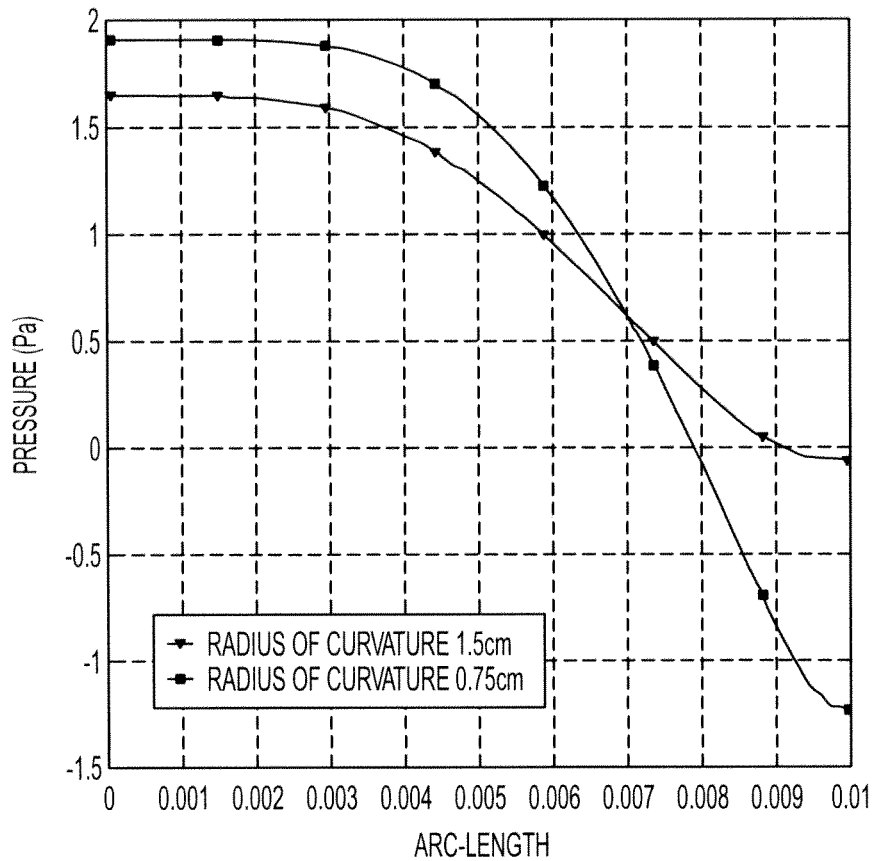
FIG. 3 illustrates a pressure profile for a bend in a channel.
Figure 3B:
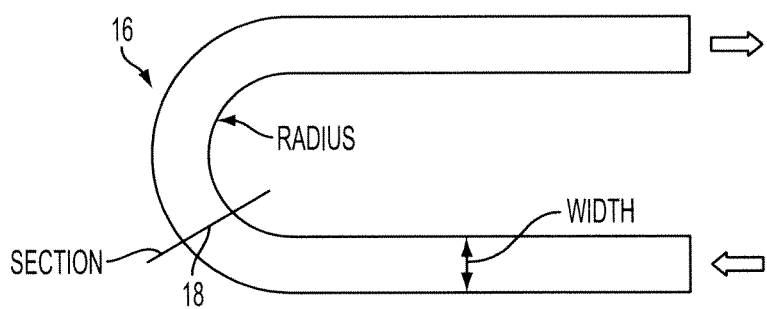

It should be understood that this transverse pressure is affected by the radius of curvature of the channel. FIG. 3 shows the pressure distribution across a channel 16 at a selected transverse section 18. It can be seen that a higher gradient is observed with the lower radius of curvature (0.75 cm) and with the same channel width and flow velocity.

Figure 4:
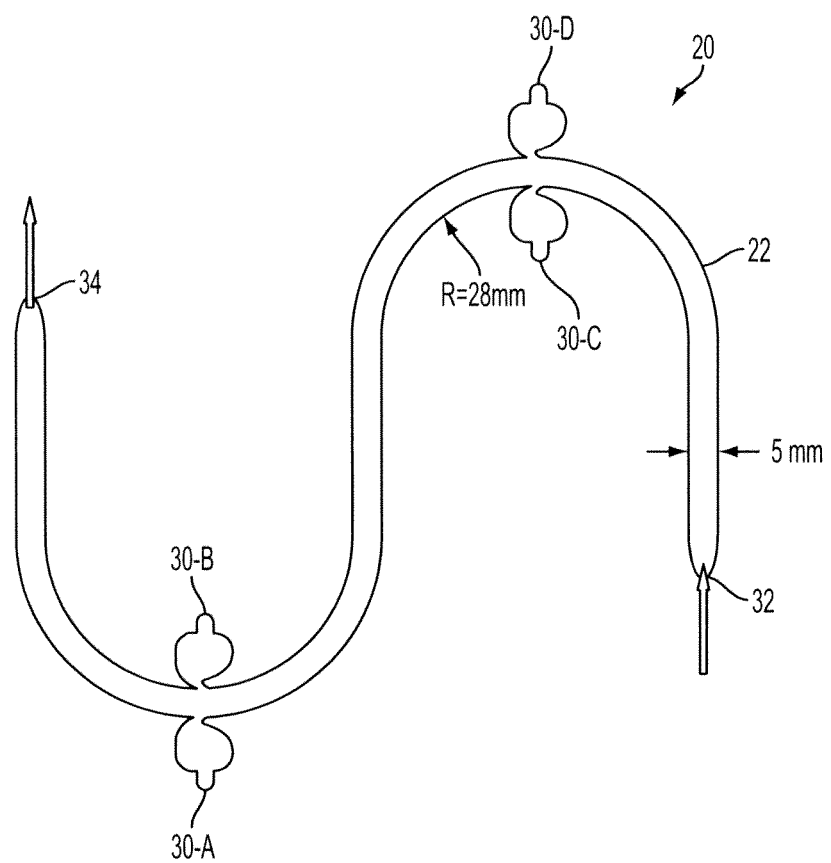
FIG. 4 illustrates a device according to the presently described embodiments.
Figure 5:
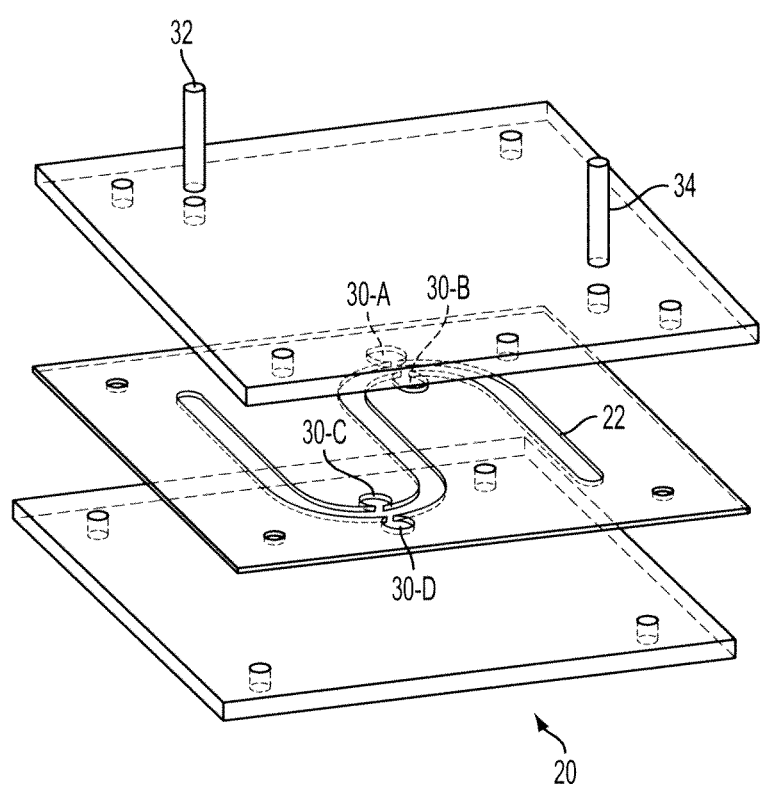
FIG. 5 illustrates a device according to the presently described embodiments.

A schematic drawing of an example particle separation device 20 according to the presently described embodiments is shown in FIG. 4. FIG. 5 shows a perspective and exploded view of the device 20 of FIG. 4.

As shown, the width of a channel 22 of the device 20 is, for example, 5 mm. The radius of curvature of both the curved sections is, for example, 28 mm. The thickness of the whole structure 20 is, for example, 500 m (0.05 cm). Collection chambers 30 (e.g. 30-A, 30-B, 30-C and 30-D) are located strategically on curved portions of the channel 22 so that the particles will move into them as soon as they encounter a resultant directional force. Collection chambers 30-A & 30-D lay on the outside of the curved or serpentine channel 22. Chambers 30-B & 30-C lay on the inside of the curved channel 22. The fluid containing particles enters through an inlet 32, which is connected to, for example, a peristaltic pump (not shown). The fluid passes through the two curvatures of the serpentine channel 22 and exits through an outlet 34. Two different flow rates were used for the experimental purpose viz. 5 ml/min and 14 ml/min. It should also be understood that the particles may be removed from the collection chambers by any known means, including insertion of a pipette for withdrawal of particles.

As will be apparent from FIG. 5, although a variety of materials may be used, the channels may be formed by cutting silicone sheets to the required dimensions using a laser cutter. A variety of different materials may be used; however, as shown, acrylic sheets form top and bottom covers and also provide holes for inlet 32 and outlet 34. The channel 22 was primed with DI water to remove bubbles and then a solution containing particles was passed at two different flow rates forming the parts of two different experiments.

Different results were observed at two different inlet flow rates. At a flow rate of 5 ml/min (approximate velocity of 3.2 cm/s), the force on the particle due to the pressure difference across the channel 22 was dominant compared to the centrifugal force experienced by the particles. This force is directed inwards towards the centroid of the radius of curvature. Thus, particles move towards this center of the curvature when they come across the curved section. This inward force acting on the particle pushes them in the collecting chambers 30-B and 30-C which are situated inwards of the curvature.

Figure 6:
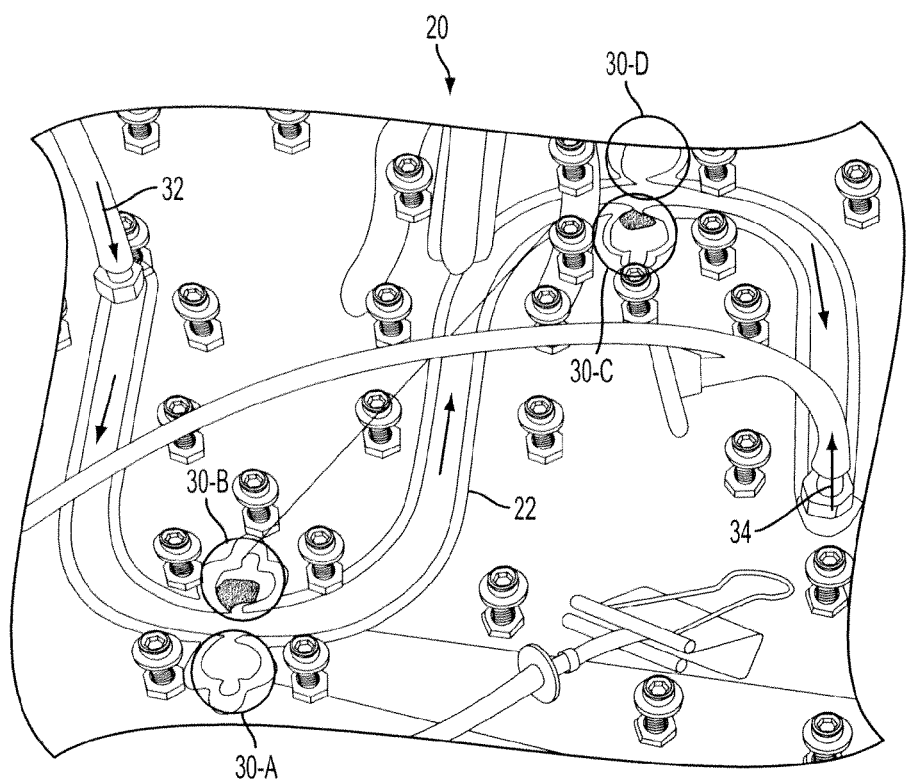
FIG. 6 illustrates a device according to the presently described embodiments.

FIG. 6 shows particle laden fluid flowing through the channel from the inlet to the outlet along a serpentine path at an inlet flow rate of 5 ml/min. Particles used are FDA approved organic materials with a wide range of granularity. It can be seen that the particles get diverted into the inner collection chambers 30-B and 30-C and not in the chambers 30-A and 30-D which are situated outwards of the curvature just opposite of the inner collection chambers.

Figure 7A:
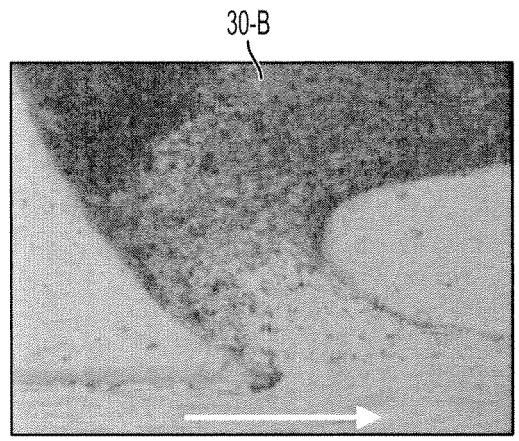
FIG. 7 illustrates a device according to the presently described embodiments.
Figure 7B:
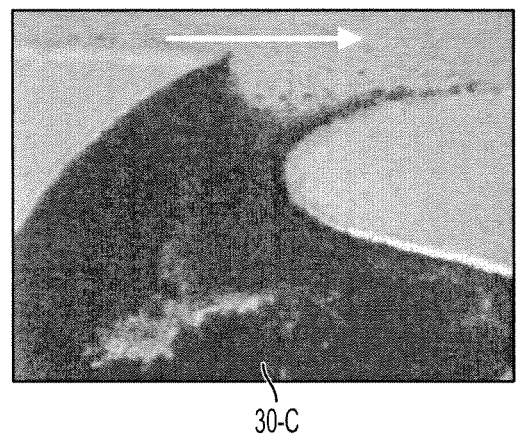

FIGS. 7(a) and (b) show enlarged views of the collection chambers 30-B and 30-C which are shaped to de-couple fluidics but allow particle capture. Note that the flow is in the opposite direction to that indicated in FIG. 4 as the acute entry angle with the collection chamber is more efficient at decoupling the flow field and allowing particles to be trapped.

Figure 8:
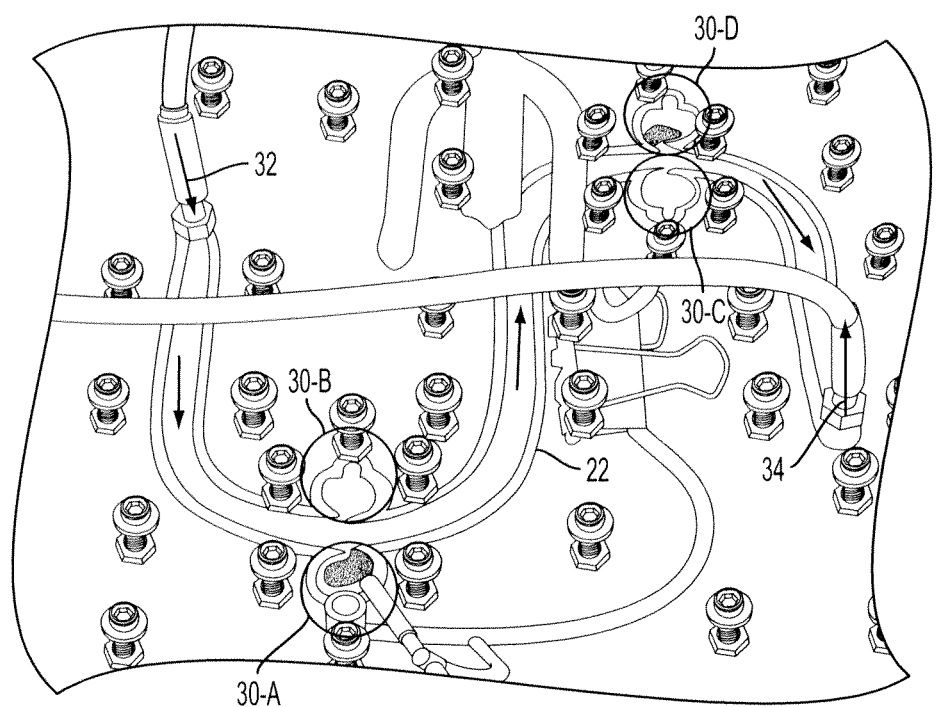
FIG. 8 illustrates a device according to the presently described embodiments.
Figure 9A:
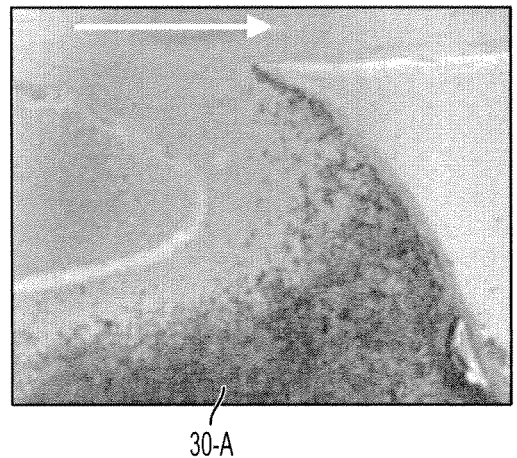
FIG. 9 illustrates a device according to the presently described embodiments with particles collected in specified cavities.
Figure 9B:
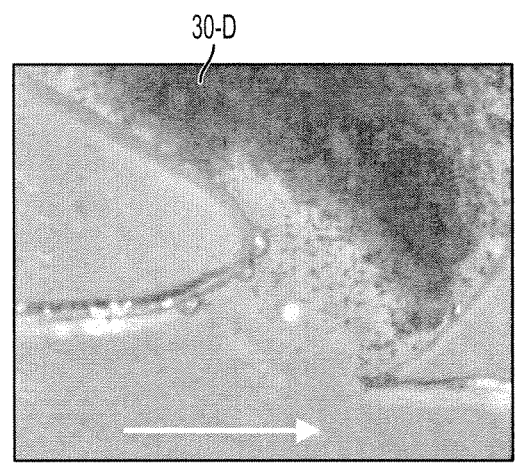

With reference to FIG. 8, at a flow rate of 14 ml/min (approximate velocity of 9.3 cm/s), the centrifugal force on the particle dominates over the force due to the pressure gradient experienced by the particles. This force is directed outwards away from the centroid of the radius of curvature. Thus, the particles move away from this center of the curvature when they come across the curved section. This outward force acts on the particle and pushes them into the collecting chambers 30-A and 30-D, which are situated outwards of the curvature. FIG. 8 shows particle laden fluid flowing through the channel from the inlet to the outlet along a serpentine path at an inlet flow rate of 14 ml/min. It can be seen that the particles get diverted into the outer collection chambers 30-A and 30-D and not in the chambers 30-B and 30-C which are situated inwards of the curvature just opposite of the outer collection chambers. FIG. 9 shows enlarged views of the collection chambers 30-A and 30-D which are also shaped to de-couple fluidics but allow particle capture.

The required flow length of the channels is designed to meet the channel width and flow velocity for the particle size range. The equation of motion in the radial direction for outward directed motion is given by:

$$m\frac{dV_r}{dt} = \frac{mV_\theta^2}{R} - p\pi a^2 - 6\pi\eta a V_r = (\alpha - \beta V_r)m$$

where $$\alpha = \frac{V_\theta^2}{R} - \frac{p\pi a^2}{m}$$

$$\beta = \frac{6\pi\eta a}{m}$$

The solution to equation of motion is the radial velocity:

$$V_r = \frac{\alpha}{\beta}(1 - e^{-\beta t})$$

with acceleration time-constant, $\tau$, given as:

$$\tau = \frac{1}{\beta} = \frac{m}{6\pi\eta a}$$

and terminal velocity of $$V\infty = \frac{\alpha}{\beta}$$

The corresponding relationships for inward motion where transverse pressure is dominant may be derived by changing the polarity of the centrifugal and pressure driven forces in the equation of motion.

This transit time has to be considered together with sedimentation time given by:

$$\tau_s = \frac{h}{V_y}$$

where h is channel height and $V_y$ is given by $$V_y = \frac{\gamma \frac{4}{3}\pi r^3 \rho_{particle} g}{6\pi\eta a}$$

and $\gamma$ is the buoyancy term given by:

$$\gamma = \frac{\rho_{particle} - \rho_{fluid}}{\rho_{fluid}}$$

For particulate separation, these relations are used to design the device for the desired particle size range. Strategic locations for collection chambers are selected based on transit times and transverse migration velocities.

Figure 10:
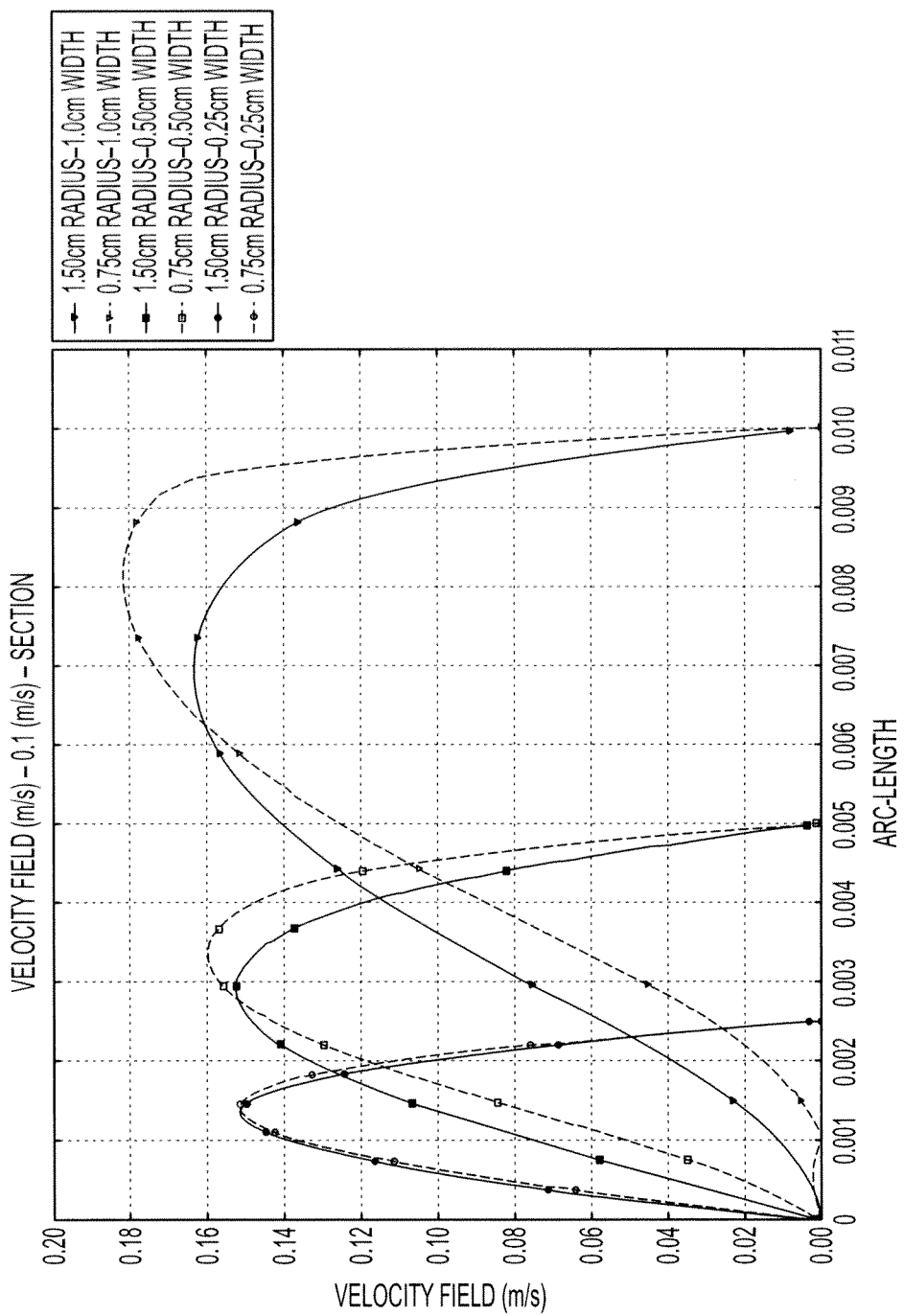
FIG. 10 illustrates a velocity profile.
Figure 11:
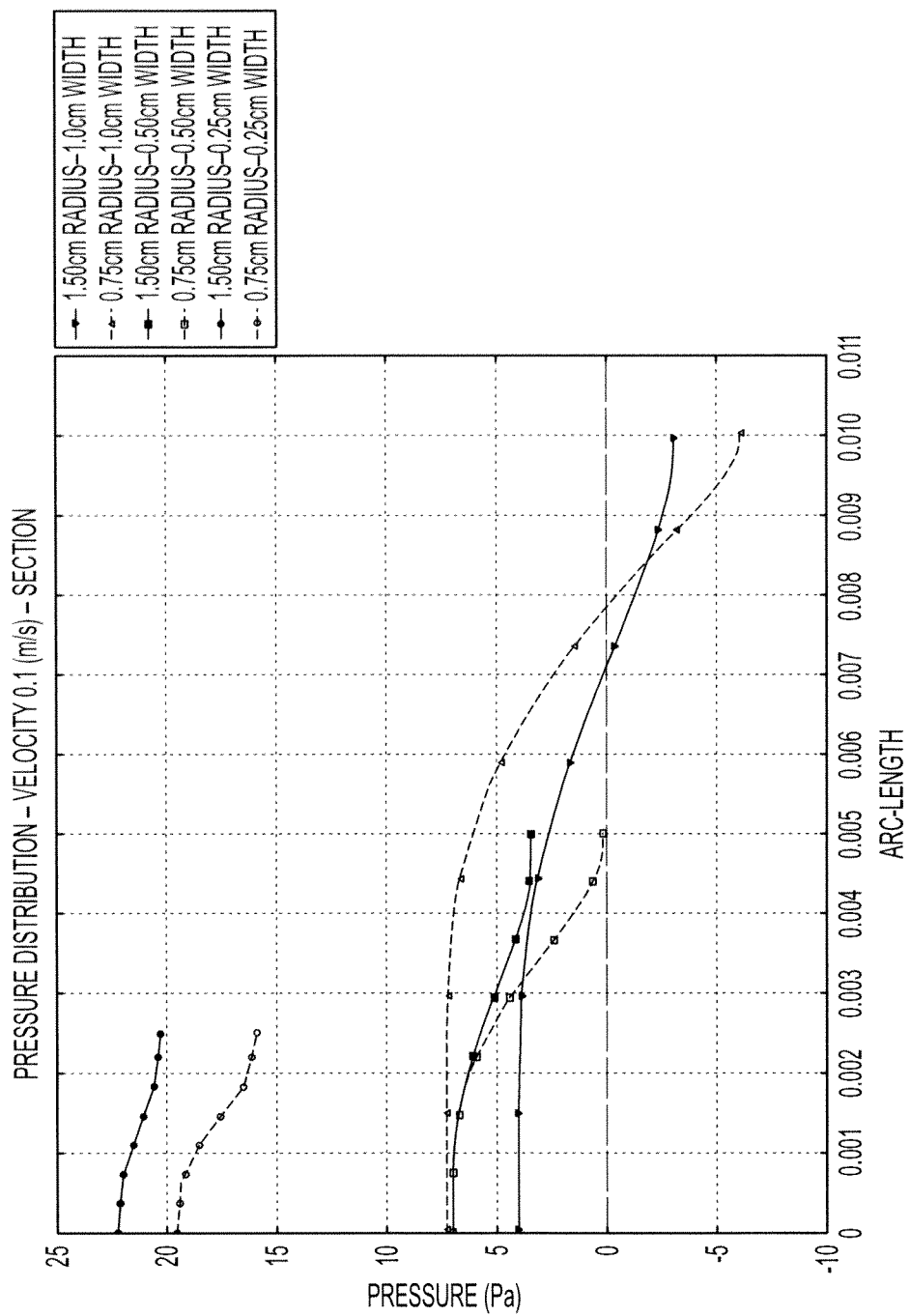
FIG. 11 illustrates a pressure profile.

FIG. 10 shows velocity profiles for three channel widths with the same inlet velocity boundary condition and zero pressure at the exit. The parabolic profile is no longer symmetric about the centerline of the channel. Rather, it is shifted towards the inside wall. FIG. 11 shows the corresponding pressure profiles. The pressure gradient is greater in the channel with smaller radius of curvature (0.75 cm) compared to 1.5 cm. There is a greater shift in the parabolic velocity profile towards one side of the wall with the smaller radius of curvature channel (0.75 cm). Also, the magnitude of the velocity is generally greater for the smaller radius of curvature channel.

Figure 12:
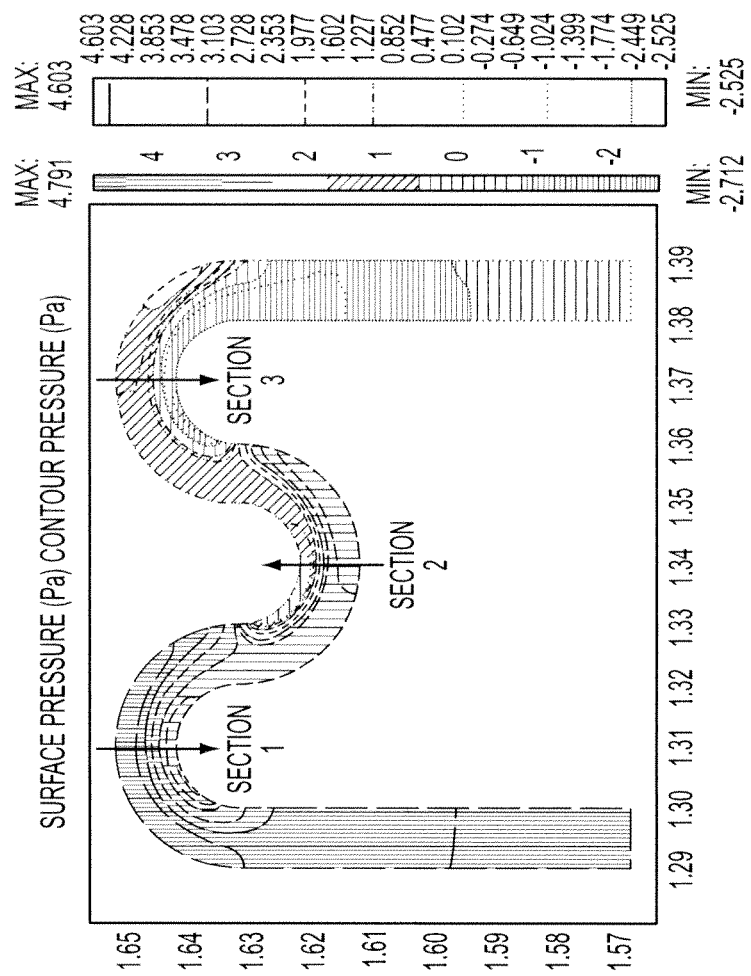
FIG. 12 illustrates a shaded pressure plot.
Figure 13:
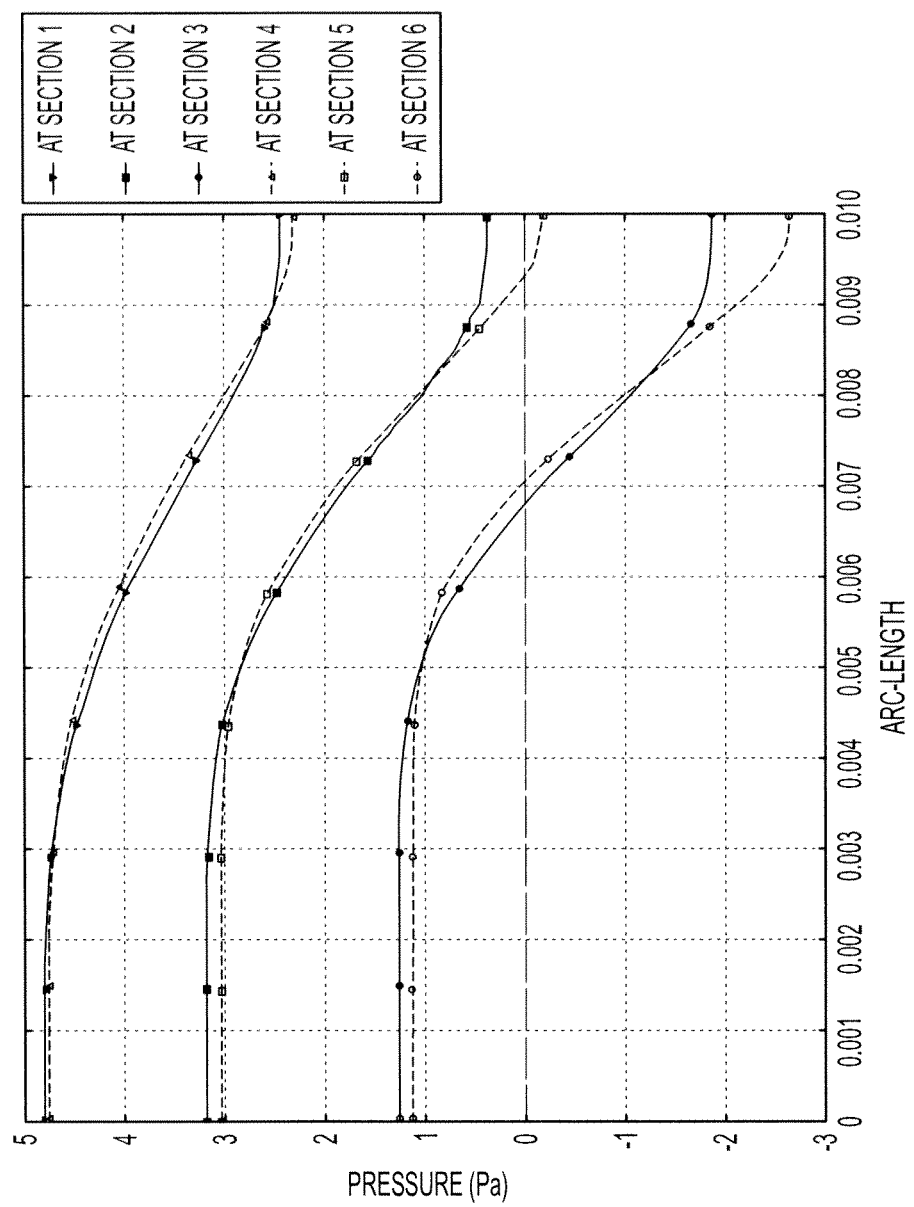
FIG. 13 illustrates a pressure profile.
Figure 14:
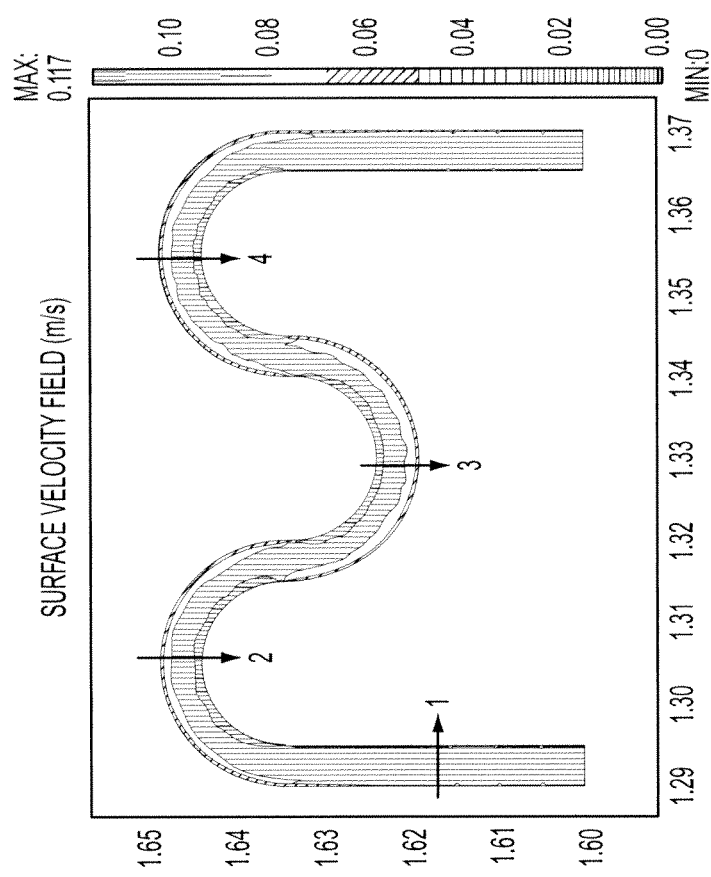
FIG. 14 illustrates a shaded velocity plot.

The flow solution for a three-turn serpentine section configuration is simulated in 2D as shown in FIG. 12. The corresponding cross-channel pressure distributions are shown in FIG. 13. A larger gradient is found at a section just before the apex of the turn, as compared to the gradient in the apex itself. Strategically placing the collection point at this region may provide better collection efficiency.

Figure 15:
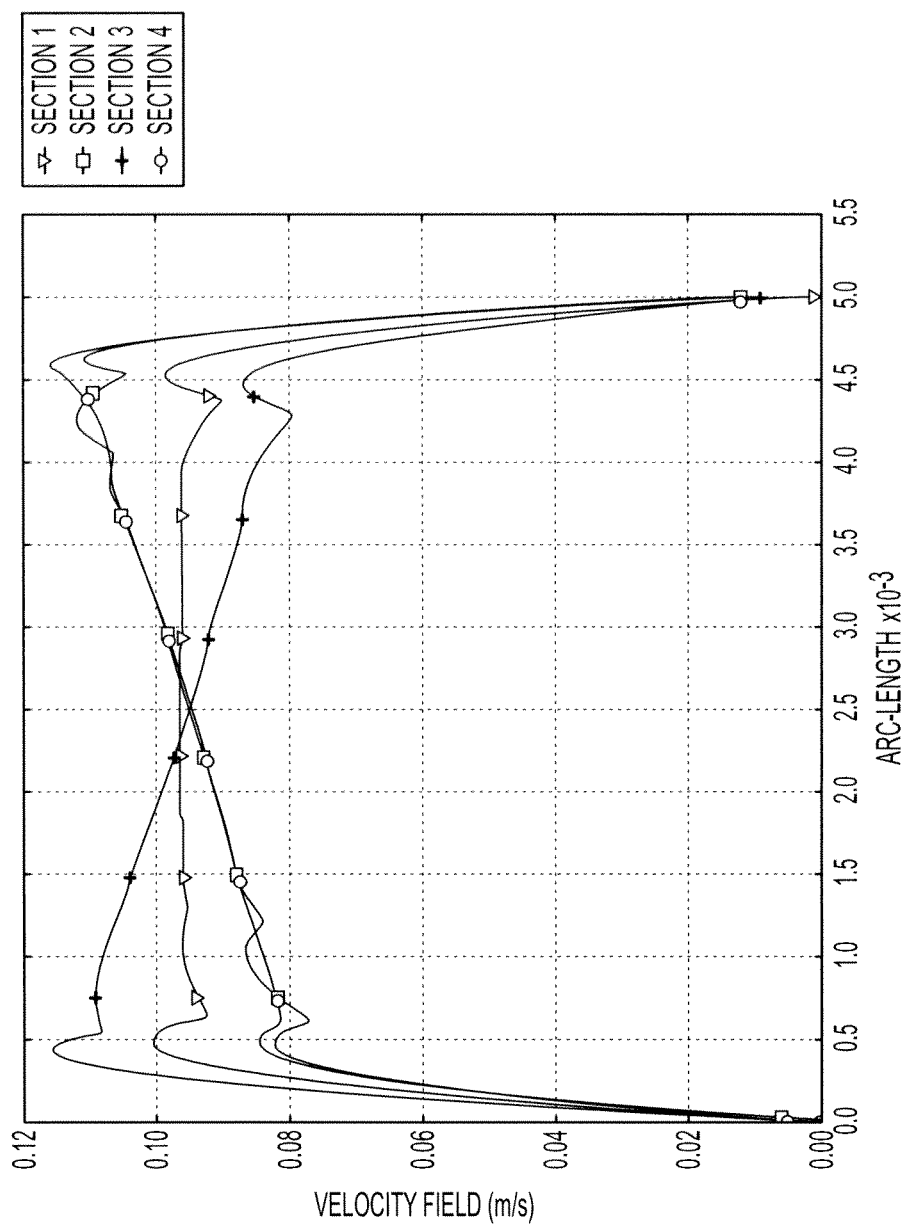
FIG. 15 illustrates a velocity profile.
Figure 16:
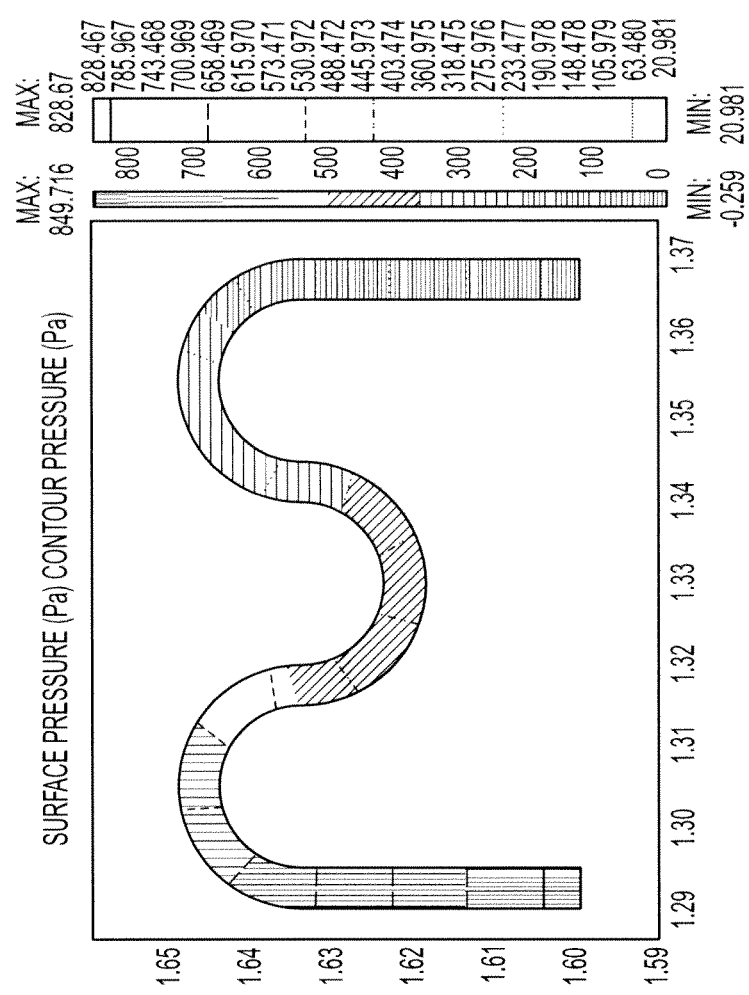
FIG. 16 illustrates a shaded pressure plot.
Figure 17:
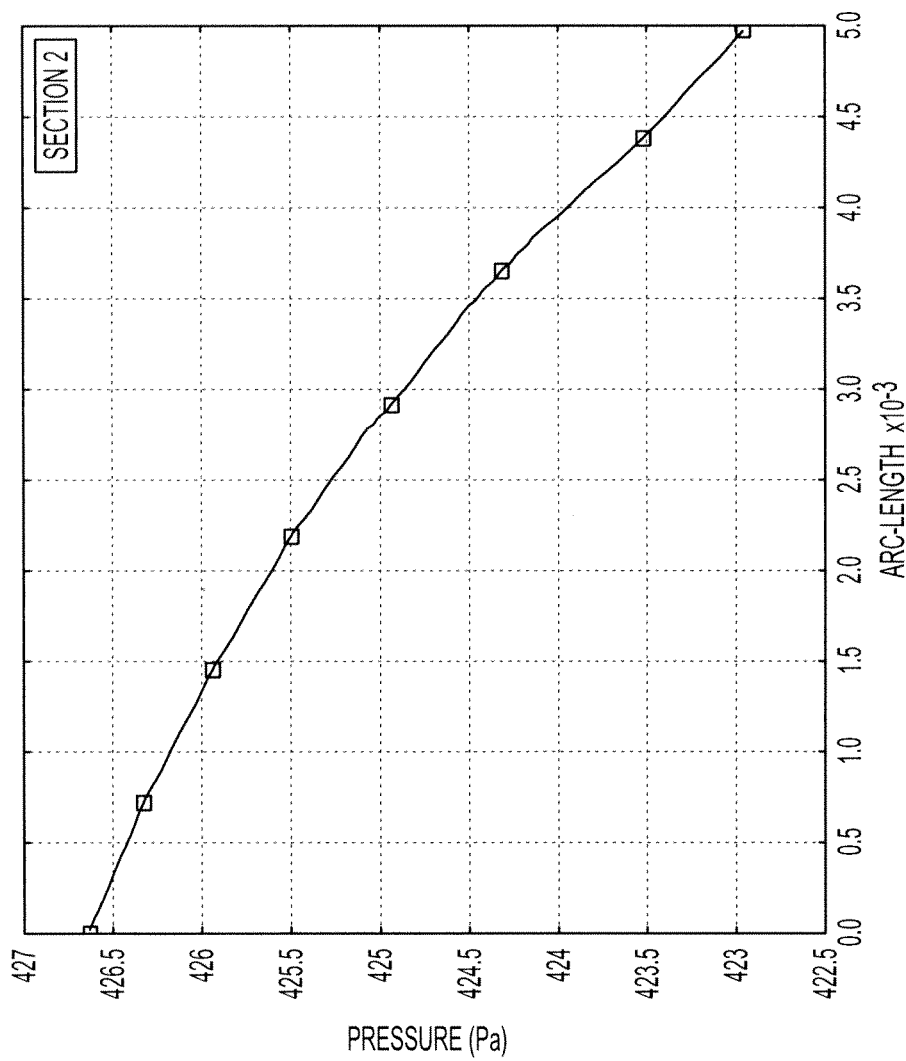
FIG. 17 illustrates a pressure profile.
Figure 18:
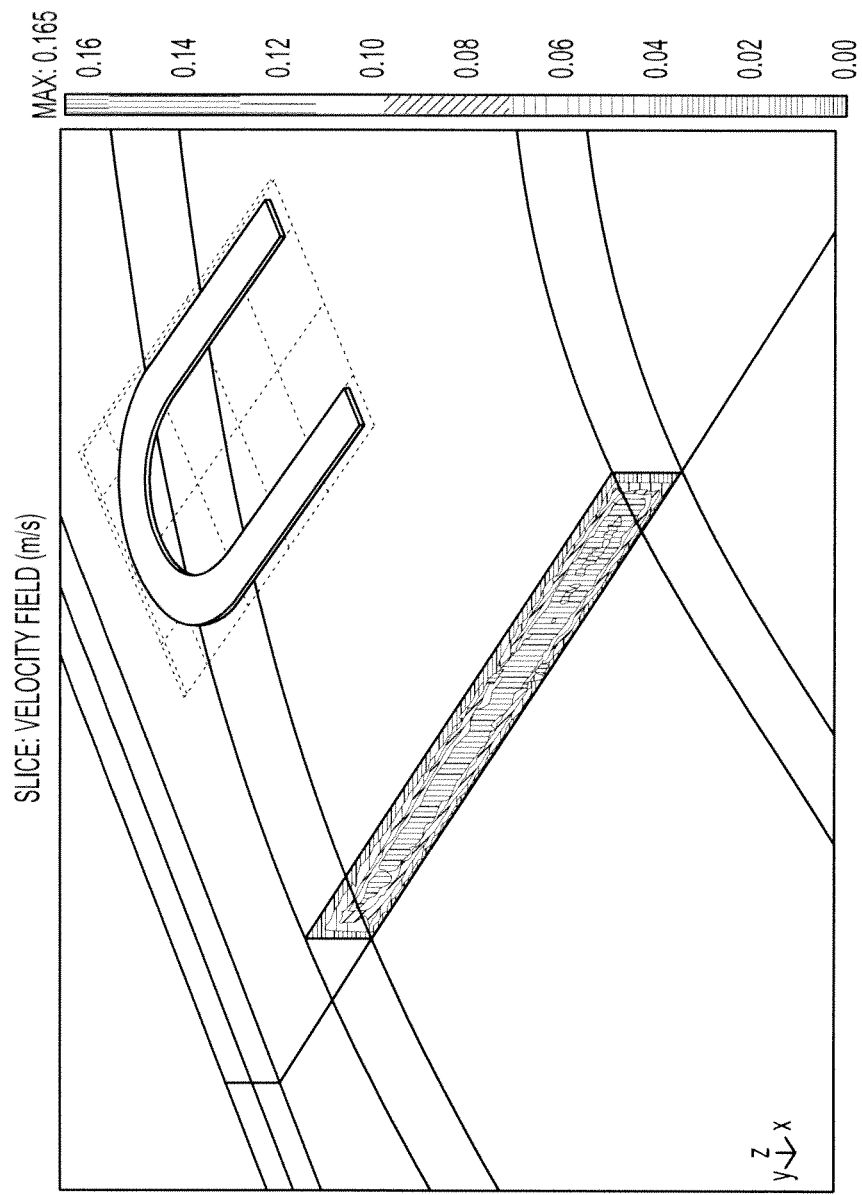
FIG. 18 illustrates a velocity cross-section.
Figure 19:
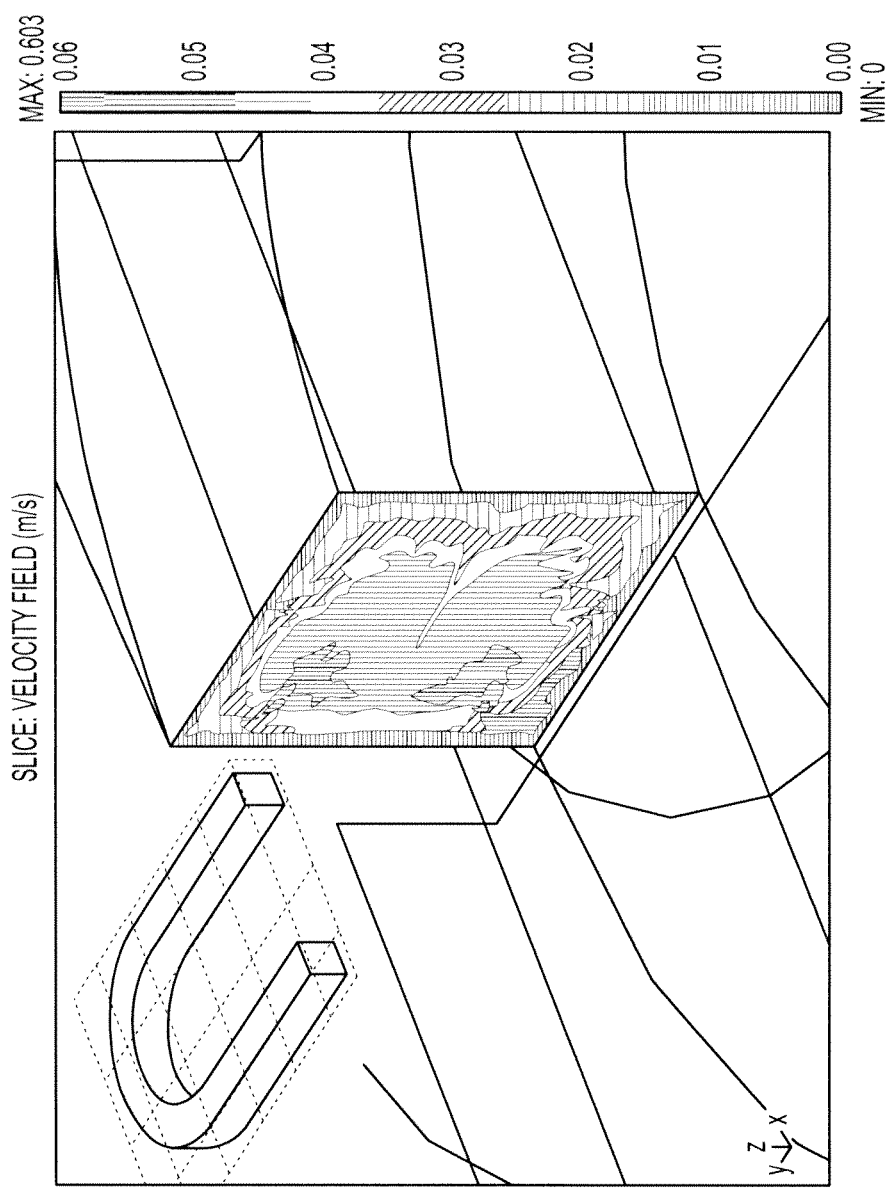
FIG. 19 illustrates a velocity cross-section showing a Dean vortex.

For shallow micro-channels, the increased drag from the top and bottom fluid bearing surfaces may be approximated by addition of volume body force terms. The velocity and pressure solutions are shown in FIGS. 14-17. In particular, FIG. 15 shows a flatter flow profile than the customary parabolic profile due to the increased drag at the top and bottom. The bumps near the top and bottom boundary are non-physical computational artifacts due to the meshing. FIG. 17 shows the pressure profile which does not have the customary flat behavior in the vicinity of the boundaries. The pressure change is identical at 4 Pa for this set of parameters. The key observation is that the pressure curve does not have the two inflections so a monotonic force exists to move particles entirely across the channel width. FIG. 18 shows the absence of transverse Dean's vortices with shallow channels. The square cross-section channel in FIG. 19 exhibits the expected Dean's vortices, which is undesirable for this implementation.

Figure 20A:
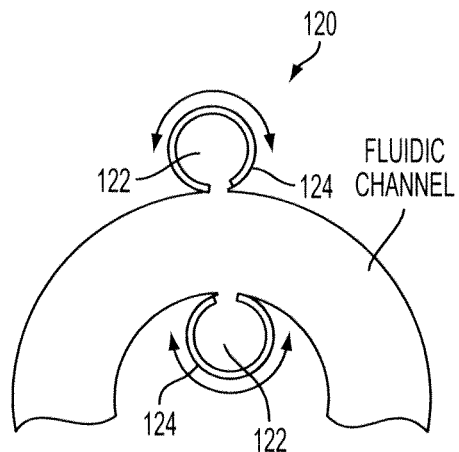
FIG. 20 illustrates a device according to the presently described embodiments.
Figure 20B:
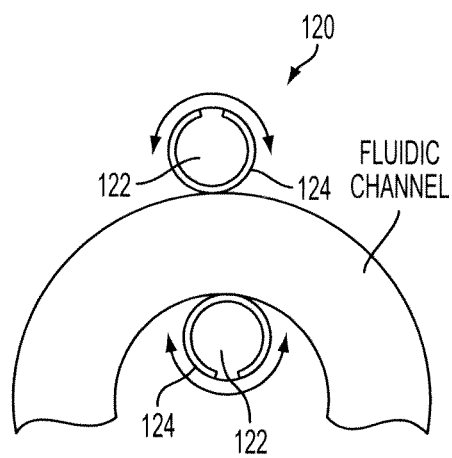

FIG. 20 shows a device 120 having collection wells 122 in the form of a circular walls 124 which may be rotated to opened or closed positions. This form of collection well enables time sequenced collection and storage of particles to prevent dilution or mixing after separation. It should be appreciated that the circular walls 124 may take the form of collars (having openings) that may be suitably fit to the wells 122 and rotated as described from opened to closed positions as may be desired.

Figure 21:
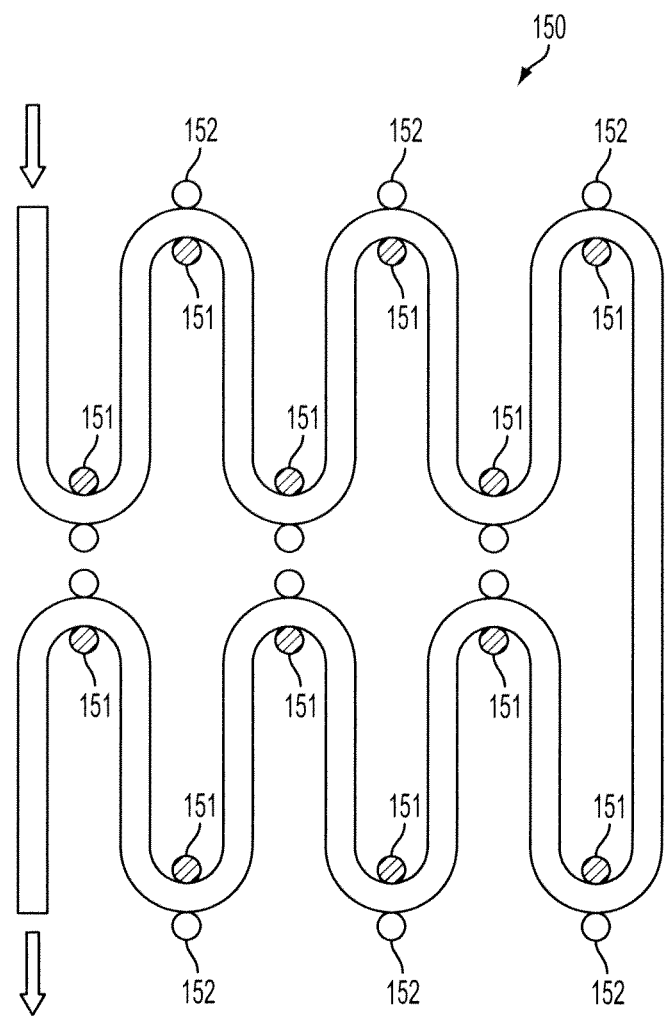
FIG. 21 illustrates a device according to the presently described embodiments; and, FIG. 22 illustrates a device according to the presently described embodiments.
Figure 22:
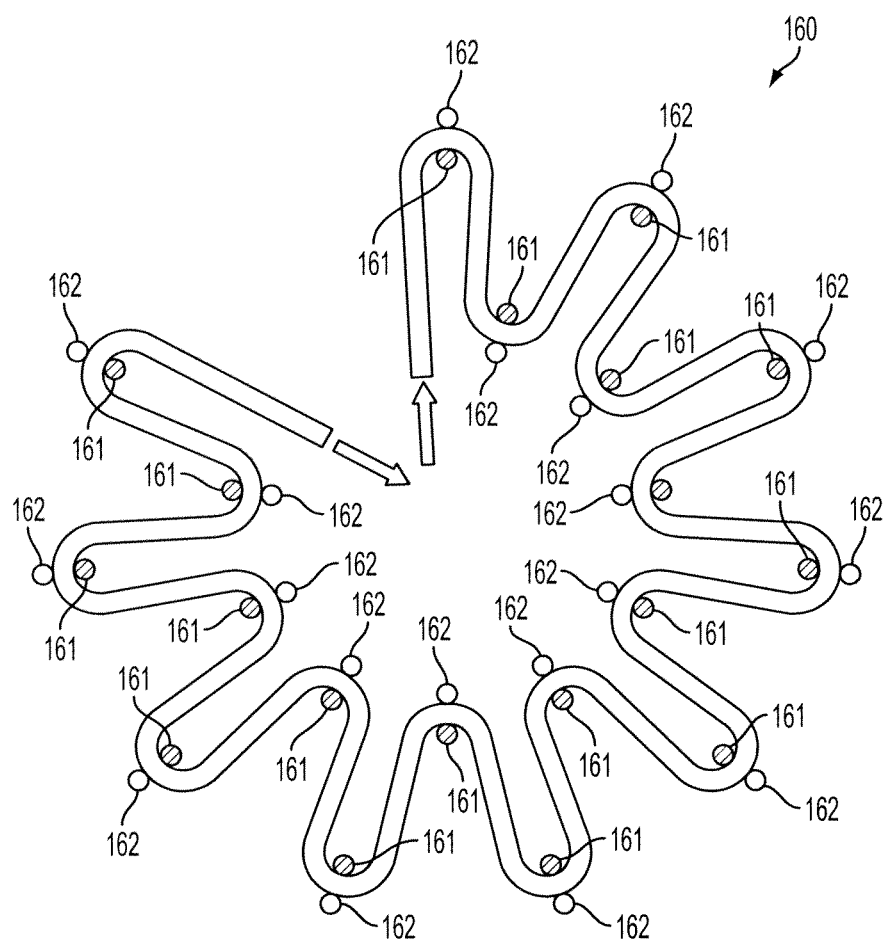

Other serpentine layouts include, but are not limited to those shown in FIGS. 21 and 22. With respect to FIG. 21, a device 150 is illustrated. The device 150 operates in substantially the same manner as those embodiments described above. However, the device 150 includes additional curves (e.g. 12 curves) of the serpentine structure. Also, the overall structure is configured to make efficient use of space. In FIG. 22, a device 160 is illustrated. Similarly, the device 160 includes additional curves of the serpentine structure. However, in this configuration, the curves are disposed in a radial arrangement, which may produce additional desired forces on the particles being separated. In both of these configurations, the collection chambers are shown arbitrarily located at the mid-point of the curved serpentine sections. The hatched chambers 151 and 161 are for inward pressure driven separation while the un-shaded chambers 152 and 162 are for centrifugal driven use.

The presently described embodiments address the issue of the use of an external field required for manipulating particles in the fluid that hampers the prior work in this field. According to the presently described embodiments, particles can be separated from the fluid by simply shaping the geometry of the channel and the flow rate. Controlling the above parameters provides a more convenient manner of separating particles than is experienced using a transverse field as in FFF. Another advantage of this method is that continuous particle separation of a wide range of liquid volumes can be achieved. This is an advantage when compared to techniques such as centrifugation or chromatography where real time particle collection cannot be possible.

As compared to other continuous particle separation processes, there are advantages in the simplicity in geometric control of the device. In the continuous separation processes, which are typically based on Pinched Flow Fractionation, the sample flow stream has to be coupled with the media flow stream to decide the orientation of the particles, size-wise, at the inlet section. The dimensions of this inlet section are comparable with the dimension of the particles. So precise control over the inlet section, where the pinched section lies, is required. The geometry of this section determines the separation trends downstream. Also precise control of the flow rate of the media and sample are required. In the case of the presently described embodiments, geometric controls are only required on the channel width, height and the radius of curvatures of the curved sections. The channel widths need not be comparable with the size of the particle in question. The magnitude and the direction of the force on the particle can be manipulated just by changing these geometric parameters and the flow rate.

By altering the channel widths and the radius of curvatures of the curved sections, different size particles can be collected at different collection chambers along the length of the serpentine channel. The device can be scaled to separate particles sized below 10 μm. This is the typical range of biological samples.

The collection efficiency can be improved by, along with dimensional changes, the strategic placement of collection chambers. Simulation results have shown that pressure gradient along the width of the channel is maximum just before the curvature apex. The placement of collection chambers at these locations should result in better collection efficiencies.

A micro-scale version of such a device can be fabricated with simple techniques and can be easily integrated inline with other components in a Lab-on-a-chip type environment. The simplicity comes with the fact that the a use of an external field is eliminated. This makes the micro-scale analysis device much more simple and reliable.

Several embodiments can be tailored for specific applications. A simple application is the extraction of all particulates (concentrate all particles without discrimination) from a fluid stream. Then only one collection chamber would be needed at the end of the fluidic path. A more delicate task of separation would require sequential collection of particles starting with the largest at the upstream sample well which may then be closed-off to prevent particles with other properties from entering. The number of collection chambers and their locations may be selected by design considerations of the fluidic dimensions, particle size range, and flow velocity.

Selection of the centrifugal or pressure driven separation modes may be based on the expected functionality. For large sample volumes and high throughput, the centrifugal mode would be preferred. The pressure driven mode would be ideal for small sample volumes. This latter mode is also amenable to miniaturization.

Another consideration is the use of serpentine channels with converging or diverging cross-sections to take advantage of the pressure derivative: $dp/dR \propto 1/R^2$.

Yet another consideration is the use of a compression field to load particles against the bottom of the channel for improved operation.

The implementation may be entirely planar with out-of-plane inlet and outlet such as in FIGS. 5, 6 and 8. This makes it easier to stack several devices on top of each other for parallel operation.

Overall, presently described embodiments are based on interplay of several forces acting on the particles in a curved section of the channel leading to a controllable resultant movement of the particles in the transverse direction. This phenomenon does not depend on any external field for particle manipulation. A continuous particle sorting functionality is possible depending on the device geometry and number of serpentine loops. The contemplated device may be planar with an out of plane inlet and outlet. This makes it easier to stack several such devices together for parallel operation. The collection chambers can be accessed from the sides. The compactness and elimination of an external field makes it a very good candidate for Lab-on-chip type applications.

The particles migrate across the channel width in moving from one serpentine loop to the next. This migration proceeds in an ordered manner in the connection pathway between two sequential loops, and may be exploited for separation by strategic location of an array of collection wells along the channel bottom.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for separating particles within a fluid, the method comprising:
    receiving a continuous flow of fluid through an inlet of a serpentine channel having back and forth turns;
    producing forces on the continuous flow of fluid based on the flow through the back and forth turns; and,
    collecting particles in at least one collection chamber disposed along the channel positioned and shaped to collect particles pushed therein from the continuous flow of fluid by at least one of the forces.

2. The method as set forth in claim 1 wherein collection of particles in the collection chambers depends on at least one of flow velocity, channel width, viscosity and radius of curvature.

3. The method as set forth in claim 1 wherein collection of particles depends on a velocity of the fluid.

4. The method as set forth in claim 3 wherein a low velocity of the fluid results in the at least one force being a fluid pressure-driven force.

5. The method as set forth in claim 3 wherein a high velocity of the fluid results in the at least one force being centrifugal force.

\* \* \* \* \*